May 12, 1936. A. DIETRICH 2,040,203
AUTOMATIC BRAKE SHOE PRESSURE ADJUSTING APPARATUS FOR RAILWAY VEHICLES
Filed Oct. 6, 1932
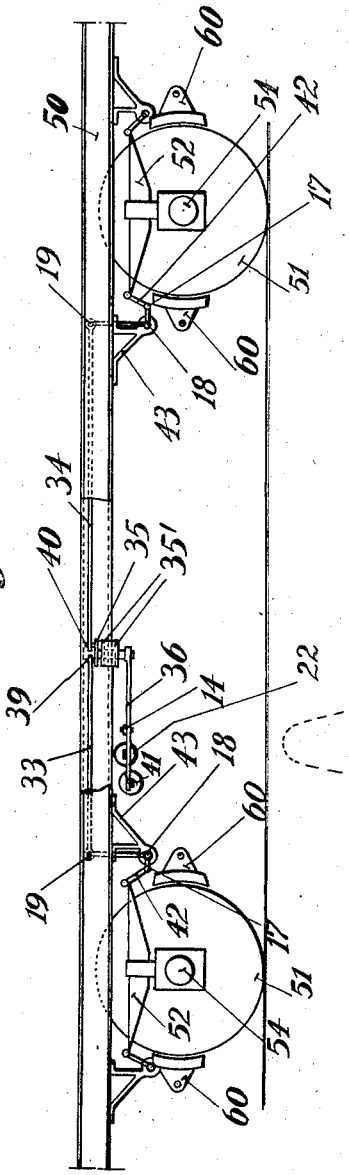
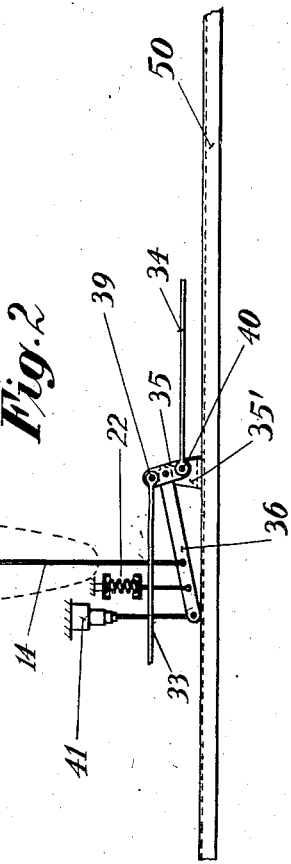
Inventor
A. Dietrich
By
E. F. Wenderoth
Atty Patented May 12, 1936

2,040,203

UNITED STATES PATENT OFFICE 2,040,203

AUTOMATIC BRAKE SHOE PRESSURE ADJUSTING APPARATUS FOR RAILWAY VEHICLES

Anton Dietrich, Graz, Styria, Austria, assignor to the firm Grazer Waggon- und Maschinenfabriks-Actiengesellschaft vormals Joh. Weitzer, Graz, Styria, Austria, a company of Austria Application October 6, 1932, Serial No. 636,600
In Austria November 2, 1931

2 Claims. (Cl. 188—195)

The invention relates to an automatic apparatus for automatically adjusting the brake shoe pressure of railway vehicles in accordance with the load carried by them. In apparatus of this class it has been proposed to vary the leverage of the link and lever gearing of the brakes for the purpose of varying the brake shoe pressure by means of an element which is actuated by the variations of the spring support pressure of one of the vehicle axles. See for instance the application of February 26, 1931, Serial No. 518,572, which resulted in United States Patent No. 1,898,528 granted February 21, 1933. Therefore unless the load be uniformly distributed over the length of the vehicle, the brake shoe pressure is not adjusted exactly in accordance with the total load carried by the vehicle and this may prove objectionable in many cases.

The object of my invention is to do away with this drawback and with this object in view the element serving for varying the leverage of the link and lever gearing of the brakes is actuated by the variations of the spring support pressures of two axles of a vehicle having two or more axles, that is to say in accordance with the total load carried by the vehicle.

In the preferred embodiment of my invention I interpose between each of the inner supporting links of the two wheels or axles selected and the associated brackets a lever pivoted to the said bracket, and cause the two levers to act through the medium of a link and lever gearing on a lever the fulcrum of which is fast relatively to the axles this lever transmitting the forces of the supporting springs acting thereon to the counteracting springs and actuating the element serving for varying the leverage of the link and lever gearing of the brakes.

In the accompanying drawing I have illustrated by way of example an embodiment of my invention, the drawing showing in Figure 1 a diagrammatical side elevation of the parts of the mechanism necessary for the understanding of the invention, Figure 2 is an inverted plan view of part of Figure 1.

In the drawing 50 are the longitudinal beams of the vehicle frame, 51 are the wheels, 52 the supporting springs and 54 the axles.

The inner suspending links 42 are not directly hinged to the associated spring supports or brackets 43, but are connected with the said brackets by bell crank levers 17, 19 pivoted to the said brackets at 18. The outer end 17 of one of the arms of the bell crank lever is pivotally connected to the link 42 and the outer end 19 of the other arm of the bell crank lever acts on a rod 34 connected to one end 40 of a lever 35, having a fixed fulcrum mounted in a suitable support 35' on the vehicle frame. The other end 39 of the lever 35 is connected by a rod 33 to the end 19 of the bell crank lever of the second axle. Whenever the load carried by the vehicle increases also the forces transmitted to the supporting springs will increase, whereby the lever 35 will be turned clockwise round its fulcrum 35 through an angle which is at least approximately corresponding to the load carried by the vehicle even if, owing to an irregular distribution of the load over the length of the vehicle, one end of the vehicle would sink to a greater extent than the other as will be presently more fully explained.

The lever 35 carries an arm 36 rigid thereon and connected at 37 with the element 14 varying the leverage of the link and lever gearing of the brake and consequently also the brake shoe pressure. The element 14 may be of any known or preferred construction for instance a simple rod as disclosed in the Patent No. 1,898,528, dated February 21, 1933, above referred to and actuating means for adjusting the leverage of the brake actuating mechanism indicated by the brake lever 11 as fully described in the patent specification above referred to. The arm 36 is under the action of a return or counteracting spring 22 or other source of a force variable with the position of the said arm 34 and of a dash pot 41 for deadening shocks.

Owing to the elasticity of the supporting springs the excursion of the element 14 is always substantially proportioned to the total load carried by the vehicle, the one of the supporting springs of the vehicle turning the other by means of the link and lever gearing 17, 19, 33, 35, 34, 19, 17.

60 are the brake shoes.

What I claim is:

1. In a railway vehicle the combination of at least two axles, running wheels, brake shoes and supporting springs associated with said axles, longitudinal beams of said railway vehicle, said longitudinal beams being supported on the one hand directly by one of the two ends of said supporting springs of two wheels and on the other hand through the medium of an arm of a bell crank lever pivoted on said longitudinal beams by the other ends of said supporting springs, links connecting said free ends of arms of said bell crank lever each to one of the opposite ends of a lever, an arm rigidly secured to said lever, a source of force acting on said arm and varying according to the excursion and tending to move in one direction, means for actuating said brake shoes and means comprising a rod connected to said arm for adjusting the leverage of said brake shoe actuating means.

2. In a railway vehicle the combination of at least two axles, running wheels, brake shoes and supporting springs associated with said axles, longitudinal beams of said railway vehicle, said longitudinal beams being supported on the one hand directly by one of the two ends of said supporting springs of two wheels and on the other hand through the medium of an arm of a bell crank lever pivoted on said longitudinal beams by the other ends of said supporting springs, links connecting free ends of arms of said bell crank levers, each to one of the opposite ends of a lever, an arm rigidly secured to said lever, a spring acting on said arm and tending to move in one direction, means for actuating said brake shoes and means comprising a rod connected to said arm for adjusting the leverage of said brake shoe actuating means.

ANTON DIETRICH.